KAZUO DOI,
TAKERU MURAKAMI,
HIDEO KAWAMURA,
KATSUTOSHI TAKAISHI,
and
YOSHINOBU NAKANO,
Inventors BY Wenderoth Lind & Ponack Attorneys

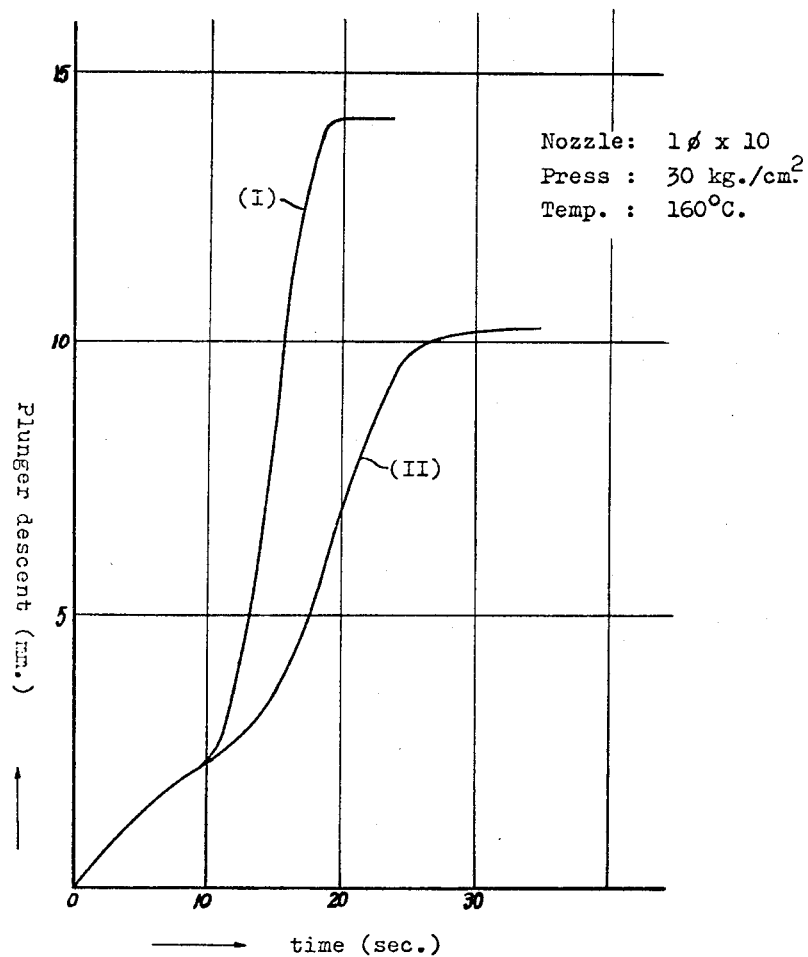
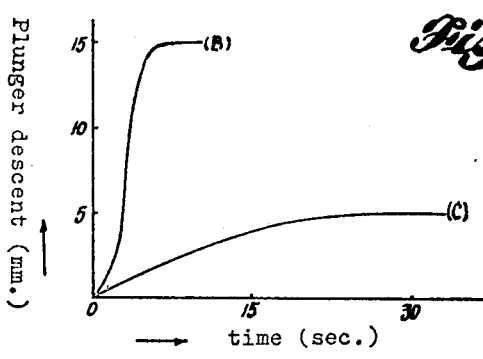

3,651,173
POLYESTER RESINS CROSSLINKED BY ALLYL
DERIVATIVES OF ISOCYANURIC ACID
Kazuo Doi, Osaka, Takeru Murakami and Hideo Kawamura, Neyagawa, Katsutoshi Takaishi, Kyoto, and Yoshinobu Nakano, Neyagawa, Japan, assignors to Matsushita Electric Works, Ltd., Kadoma, Japan
Filed June 1, 1970, Ser. No. 42,151
Claims priority, application Japan, May 31, 1969,
44/42,585, 44/42,586, 44/42,587, 44/42,592
Int. Cl. C08g 19/00, 21/00
U.S. Cl. 260—868                 5 Claims

ABSTRACT OF THE DISCLOSURE

A thermosetting solid resin composition containing one or both of prepolymers of unsaturated polyesters and prepolymers of polydiallylphthalates, an isocyanuric acid derivative as solid cross-linking agent, and an initiator. These compositions are suitable, inter alia, for producing decorative sheets and laminates, and do not become tacky at room temperature.

---

This invention relates to a thermosetting or curable resin composition and more particularly to a thermosetting or curable resin composition which comprises a polymerizable prepolymer, certain novel cross-linking agent and initiator and which is solid at the normal temperature.

As a typical thermosetting resin composition comprising a polmerizable prepolymer or precondensate and a crosslinking agent, there is known an unsaturated polyester resin composition which comprises a prepolymer of unsaturated polyester, initiator and cross-linking agent which is liquid at the normal temperature, i.e. liquid vinyl compound such as styrene, mehyl methacrylate, vinyl toluene, diallyl phthalate, etc. However, since the cross-linking agent is liquid, the resulting resin composition is in the form of liquid, slurry or tacky mass at the normal temperature so that there are various disadvantages that it is troublesome to handle, store and transport, the composition is unstable and is impossible to store for a prolonged period of time. Further when the composition is applied to or impregnated to a sheet or plate for producing decorative sheets, laminates or the like, the surface, prior to curing, is tacky because the crosslinking agent is liquid and therefore it is troublesome in handling.

In order to overcome these drawbacks there has been proposed a solid (in the granular or powder form) thermosetting resin composition comprising a prepolymer of unsaturated polyester and diallylphthalate prepolymer (as cross-linking agent) both of which are solid at the room temperature. However, this composition has various other drawbacks that the curing (or cross-linking) reactivity is low so that it takes an undesirably long time to complete the curing, the flowability at the time of molding is low and the cured product or article is low in thermal resistance and in thermal deformation temperature.

There is also known a solid thermosetting resin composition comprising a prepolymer of unsaturated polyester and acryl amide monomer (cross-linking agent) both of which are solid at the room temperature. However, this composition is low in molding property and furthermore the cured product or article is somewhat poor in the electrical properties and mechanical strength.

Therefore, it is a principal object of this invention to provide a thermosetting solid resin composition which comprises a prepolymer of unsaturated polyester and a novel solid cross-linking agent and which has no such drawbacks as mentioned before in connection with similar conventional resin compositions.

Other objects, features and advantages of this invention will be apparent from the following description.

Briefly, this invention provides a thermosetting solid resin composition which comprises, as essential ingredients, (1) at least one solid polymerizable prepolymer selected from the group consisting of prepolymers of unsaturated polyesters and prepolymers of polydiallylphthalates, (2) at least one solid cross-linking agent selected from the group consisting of isocyanuric acid derivatives represented by the general formula:

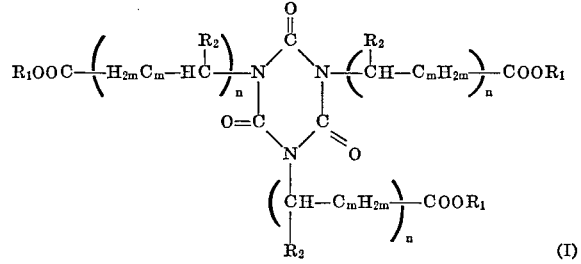

(I)

wherein $R_1$ represents allyl group, $R_2$ is a member selected from the group consisting of hydrogen, methyl group and ethyl group, $m$ is an integer from 0 to 2 inclusive, $n$ is an integer from 0 to 1 inclusive, and the carbon atom number between each nitrogen atom and corresponding —$COOR_1$ group is not higher than 3 and (3), an initiator.

In the composition of this invention the main ingredient is a polymerizable (or polycondensable) prepolymer which must be solid at normal temperature or which must have a softening point higher than 40° C. The prepolymer is selected from unsaturated polyester prepolymers (prepolymers or precondensates which are precursors of unsaturated polyesters) and polydiallylphthalate prepolymers.

Such polyester prepolymers are well known in the art. Generally, they are prepared by the polycondensation of α,β-unsaturated dicarboxylic acids such as maleic anhydride, fumaric acid, etc. with glycols such as ethylene glycol, propylene glycol, etc. in a well known manner. In this case, if desired, a part of the dicarboxylic acid may be replaced by a saturated dicarboxylic acid such as phthalic anhydride, isophthalic acid, terephthalic acid, HET acid, etc. Since these unsaturated polyester prepolymers or precondensates are so well known in the art as thermosetting or curable resin materials, no further explanation would be required thereabout. In any case, however, the unsaturated polyester prepolymers should have a softening point higher than 40° C. according to this invention. Further, it is preferable that the prepolymers have an acid value of from 15 to 40.

The diallyphthalate prepolymers to be used in this invention are also well known in the art as thermosetting or curable resin materials (diallylphthalate prepolymers of phthalic acid, isophthalic acid, terephthalic acid, halogenated phthalic acid, etc.) which are solid or have a softening point higher than 40° C., and therefore no detailed explanation thereabout would be required here. Preferably, the diallylphthalate prepolymers should have a molecular weight of from 8,000 to 25,000.

It is also possible to employ a mixture of two or more different polyester prepolymers or a mixture of such polyester prepolymer and diallylphthalate prepolymer.

The important feature of this invention is to employ, as a cross-linking or curing agent, a novel isocyanuric acid derivative which is solid at the normal temperature or has a softening point higher than 40° C. and is represented by the following general Formula I:

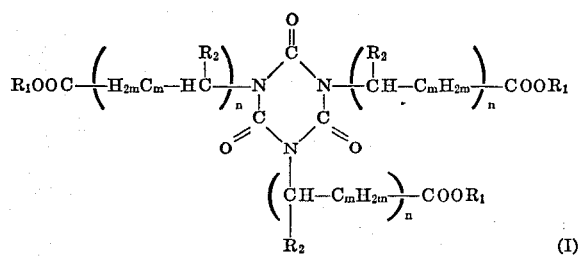

wherein $R_1$ represents allyl Group, $R_2$ represents hydrogen, methyl or ethyl, $m$ is an integer from 0 to 2 inclusive, $n$ is an integer from 0 to 1 inclusive, and the number of carbon atoms between each N atom and the corresponding —$COOR_1$ group is not higher than 3.

More particular examples of such isocyanuric acid of the Formula I are as follows:

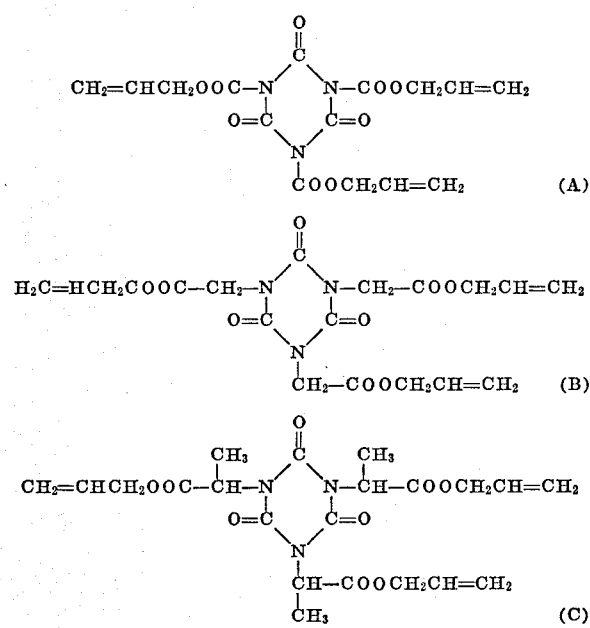

The isocyanuric acid derivatives or allyl compounds of the above Formula I may be prepared, for example, by reacting an allyl or substituted allyl ester of a monohalogeno-lower alkyl carboxylic acid, such as allyl chloroformate ($CH_2=CH—CH_2OCOCl$), monohalogenated allyl acetate or monohalogenated allyl propionate, with an alkali metal salt of isocyanuric acid in a non-protonic solvent with a high dipolar moment such as N,N-di-lower alkyl formamide, N,N-di-lower alkyl acetamide.

The amount of such cross-linking agent may vary over a wide range such as 1–70 parts by weight based on 100 parts of the prepolymer. However, when a mixture of polyester prepolymer and diallyl phthalate (usually 10–70 parts of the latter is mixed with 100 parts of the former) is employed, the diallylphthalate itself would work also as a cross-linking agent and therefore the amount of the isocyanuric acid derivative may be smaller, e.g. about 1–20 parts per 100 parts of the prepolymer mixture (mixture of unsaturated polyester prepolymer and diallylphthalate prepolymer). When unsaturated polyester prepolymer or diallylphthalate prepolymer alone is used, it is preferable to use a larger amount of the isocyanuric acid derivative, e.g. about 5–60 parts, more preferably 10–50 parts per 100 parts of the prepolymer.

The composition of this invention also comprises an initiator. Any conventional initiator known in the art of polycondensation of unsaturated polyester prepolymers may be used. Examples of such radial polymerization initiators are organic peroxides, organic peresters, organic azo compounds, etc., such as benzoyl peroxide, t-butyl- peroxybenzoate, hydroperoxide, di-t-butyl oxide. Such initiator may be used in an amount of 0.4 to 4 parts by weight per 100 parts of the prepolymer or prepolymer mixture. While some of the initiators are liquid, the amount is so small (up to 4% based on the prepolymer) that solidness (solid powder, granular or the like state) can be maintained in the resulting resin composition.

The above mentioned prepolymer, isocyanuric acid derivative and initiator are the essential ingredients of the composition of this invention. However, depending upon the particular use of the composition, there may be incorporated various other additives so far as the desired solidness is not impaired. Thus, for example, a small amount of monomer or prepolymer of diallyl chlorenedate may be added to improve flame resistant or retardant property. Further, a small amount of diallylphthalate monomer may be added to improve flowability of the composition in molten state. It is also possible to add a small amount (e.g. up to 10%) of other polymerizable vinyl monomers such as styrene, vinyl toluene, methyl methacrylate, etc.

When the composition is to be employed as a shaping or molding material, it is of course possible to add a filler (e.g. calcium carbonate, alumina, hydrated alumina, clay, kaolin, diatomaceous earth, mica, pulp, titanium oxide, silicon, etc.) and/or reinforcing material (e.g. glass fiber, asbestos fiber, rock wool, slag wool, synthetic fibrous material, etc.) which are well known in the art. If desired, a known releasing agent such as zinc stearate, calcium stearate, aluminium stearate may be added. Further, the composition may also contain a coloring material such as titanium oxide, red oxide, phthalocyanine blue, iron black, etc. The amount of these additives is not critical and may vary over a wide range depending upon the particular use. However, it is preferable that the prepolymer content in the final molding composition is 15–50% by weight.

The composition may take any form so far as its solidness is maintained. Preferably, however, the above mixture is mechanically treated to take the form of powder, granules, pellets, chips, flakes or the like depending upon the particular use. Thus, for example, a mixture of the prepolymer, cross-linking agent and initiator may be thoroughly blended and crushed into powder in a pot mill or the like. Alternatively, a mixture of the prepolymer, cross-linking agent, initiator, filler (and/or reinforcing material), if desired, and releasing agent, coloring material, etc. is thoroughly blended in a ball mil, heated kneader or the like and then crushed or formed into granules, flakes, chips or pellets.

The solid composition thus obtained by this invention is useful for making laminates, decorative sheets or the like. This can be carried out in a conventional manner. Thus, for example, a composition comprising the above mentioned prepolymer, cross-linking agent and initiator is dissolved into a suitable solvent such as ketones (e.g. acetone, methyl ethyl ketone, etc.), esters (e.g. methyl acetate, ethyl acetate, etc.), and aromatic hydrocarbons (e.g. benzene, toluene, xylene, etc.). In making a laminated decorative sheet, an overlay paper sheet or pattern paper sheet is impregnated with the above resin solution and dried. The dried sheet is placed over a base material impregnated with a thermosetting resin material (e.g. monomer or prepolymer of phenolic resins, unsaturated polyester resins, diallyl phthalate resins, melamine resins, epoxy resins, etc.), and then the assembly is pressed together under heating to form a unitary structure. In making a laminated article, a cloth, mat or the like is impregnated with the above thermosetting resin solution and is dried. A plurality of pre-impregnated and dried cloth or mat is stacked and pressed together under heating to form a unitary laminated article. In any case the pre-impregnated material is not tacky since the resin composition is solid (and not tacky or adhesive) at the normal temperature, it is very easy to handle and even when the preimpregnated material is rolled or stacked with each other there occurs no troublesome mutual adhesion. If desired, the impregnation can be conducted by heating the composition to melt the same and impregnating the sheet, cloth, mat or the like with the molten composition in the form of liquid. Thus, in this case, it is not necessary to dissolve the composition in a solvent.

The decorative sheet thus obtained is excellent in resistance to heat, water and staining. The laminate prepared as above is high in electric insulation, thermal resistance and dimensional stability and it is possible to effectively conduct metal-plating on the surface.

The composition of this invention is useful also as a shaping or molding material. Since the composition is solid and not adhesive or tacky at room temperature it can be stored for a prolonged period of time without fear of caking or agglomeration. The molding material can easily be shaped into an infusible and insoluble cured article by compression-molding, transfer-molding or injection-molding. The flowability of the molten composition at the time of molding is excellent. The resulting shaped article is high in dimensional stability, electric insulation and heat resistance.

The method for making decorative sheets and laminates and the method for molding are known per se in respect to conventional thermosetting unsaturated polyester resin materials, and it therefore is not necessary to make a further detailed explanation thereabout.

The invention will be further explained by means of the following examples which partly refer to the accompanying drawings wherein:

FIG. 4 is a graph showing the flowability of another composition of this invention; and FIG. 5 is a graph showing the flowability of still another composition of this invention.

Throughout the following examples all parts are by weight.

EXAMPLE 1

Phosgene gas was introduced through allyl alcohol at 10 to 15° C. for 3 hours to obtain allyl chloroformate having a boiling point of 59° C./100 mm. Hg. This chloroformate and a trisodium salt of isocyanuric acid were reacted with each other in dimethylformamide at 90 to 100° C. for 4 hours to obtain an isocyanuric acid derivative having the following structural formula:

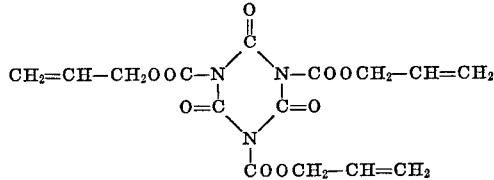

On the other hand, 1.2 mols of maleic anhydride, 0.8 mol of isophthalic acid and 2.1 mols of ethylene glycol were reacted together to prepare an unsaturated polyester prepolymer having an acid value of 25.0 and a softening point of 65 to 68° C.

15 parts of the above prepared isocyanuric acid derivative, 85 parts of the unsaturated polyester prepolymer and 1 part of benzoyl peroxide were thoroughly blended and in a pot mill. The softening point of the resulting composition was 58 to 60° C.

A sheet (thickness of 0.5 mm.) shaped from this composition by pressing a small mass of this composition between polyester films at a temperature of 150° C. was very high in the transparency. When the sheet was heat-treated at 200° C. for 3 hours, it changed to a slightly yellow color but no weight reduction was observed.

The water absorption of this sheet after the treatment in boiling water for 2 hours was 0.09% showing a considerably higher water-proofness as compared with a water-absorption of 0.2% of the sheet prepared from the same composition except that styrene was used instead of the isocyanuric acid derivative.

Even after the above mentioned composition of this invention was left at room temperature for 60 and 90 days, it could be molded or shaped exactly in the same manner and the obtained sheet had the same properties.

Figure 1:
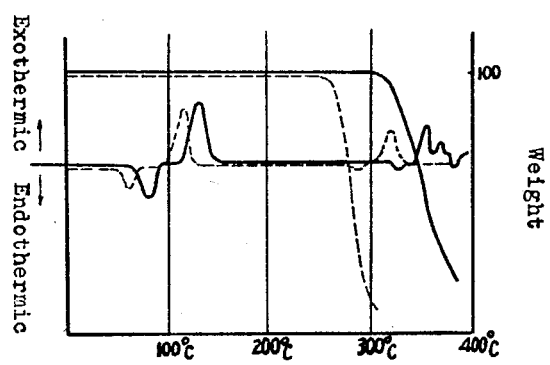
FIG. 1 is a graph showing the result of differential thermal analysis of a composition of this invention.

In FIG. 1, there are shown the results of differential thermal analysis. It will be noted that the product of the present invention indicated by the solid line is higher in heat-resistance than the control product (made by using styrene instead of the isocyanuric acid derivative) indicated by the dotted line.

EXAMPLE 2

Monochloracetic acid and allyl alcohol were reacted together in benzene and in the presence of sulfuric acid as a catalyst to obtain allyl monochloracetate (boiling point 75° C./29 mm. Hg). The acetate and a trisodium salt of isocyanuric acid were reacted with each other at 100 to 110° C. by using triethylamine as a catalyst in dimethylformamide to obtain an isocyanuric acid derivative having the following structural formula:

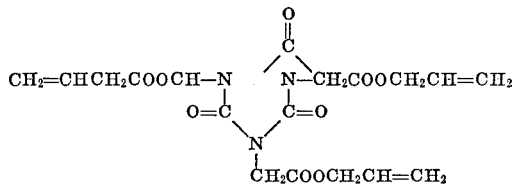

On the other hand, 1 mol of maleic anhydride, 1 mol of HET acid (trademark of Hooker Chemical Co.) and 2.1 mols of propylene glycol were reacted together to obtain an unsaturated polyester prepolymer having an acid value of 23, softening point of 85 to 86° C. and a chlorine content of about 36%.

10 parts of the isocyanuric acid derivative, 90 parts of the unsaturated polyester prepolymer and 1 part of t-butyl perbenzoate were mixed and crushed to obtain a composition in the form of powder having a softening point of 82 to 84° C.

This resin composition was sprayed on a steel plate (40 x 20 x 0.3 mm.) heated to 150° C. to form a continuous coating film thereon and then the coated steel plate was further heated at 175° C. for 5 minutes. There was formed a coating film 220 microns thick. The film was very high in transparency. Its surface hardness measured by a Barcol hardness tester was 50 to 58.

The above procedure was repeated except that the same amount of styrene was used instead of the isocyanuric acid derivative. The resulting liquid composition was applied on the same steel plate and similarly heated. The formed film was insufficient in surface curing and was sticky.

When the above mentioned composition of this invention was kept at room temperature for 60 and 90 days, it could form a coating film in exactly the same manner and the film had the same properties.

Figure 2:
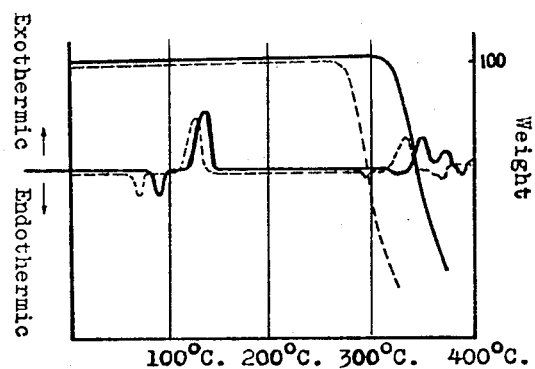
FIG. 2 is a graph showing the result of differential thermal analysis of another composition of this invention.

In FIG. 2, there are shown the results of differential thermal analysis. It will be noted that the product of the present invention indicated by the solid line is higher in heat-resistance than the control product (made by using styrene instead of the isocyanuric acid derivative) indicated by the dotted line.

EXAMPLE 3

The composition of Example 2 was dissolved in 60 parts of a mixed solvent of toluene and methyl ethyl ketone (at 1:1). The viscosity of this resin solution was 100 centipoises at 20° C. After the solution was put in a tightly plugged container and left to stand at room temperature for 60 and 90 days, the viscosity was found to be respectively 110 and 120 centipoises at 20° C. showing a considerable stability.

EXAMPLE 4

80 parts of a diallyl phthalate prepolymer (Daiso Sap, trademark of Daiso Chemical Co., Japan), 20 parts of the isocyanuric acid derivative of Example 2 and 1 part of t-butyl perbenzoate were mixed and crushed for one hour in a pot mill.

A sheet 0.5 mm. thick was molded of this composition by the same process as in Example 1. The sheet was colorless and transparent. When the sheet was heat-treated for 3 hours, it was colored to a slightly yellow color and its weight reduction was only 0.71%. When the sheet was treated in boiling water for 2 hours, the water absorption was 0.07%.

On the other hand, when a diallyl phthalate monomer was used instead of the isocyanuric acid derivative the mixture was deposited on the balls in the pot mill and could not be crushed. Therefore the mixture was thoroughly blended in a mortar and was molded into sheet in the same manner. When the sheet was heat-treated at 220° C. for 3 hours, the weight reduction was 1.53% and the water absorption rate was 0.18%.

EXAMPLE 5

215 parts by weight of a diallyl phathalate prepolymer (Daiso Dao), 85 parts by weight of an isocyanuric acid derivative of Example 2, 180 parts by weight of glass fiber (¼ inch long), 300 parts by weight of calcium carbonate, 200 parts by weight of talc, 9 parts by weight of t-butyl perbenzoate and 20 parts by weight of zinc stearate were mixed together by means of a blender. The mixture was then passed through hot rolls at 85 to 95° C. three times to form a sheet and the sheet was cooled and was crushed to be granular to obtain a molding material A. The preformances and moldability of this material A as compared with those of a commercial diallyl phthalate molding material B are shown in FIG. 3 and Table 1.

Figure 3:
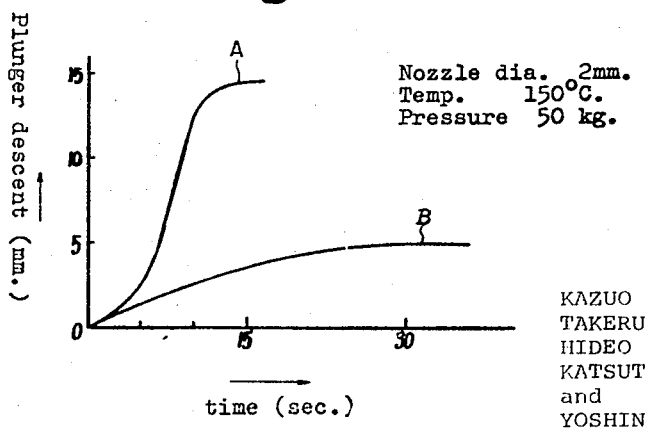
FIG. 3 is a graph showing the flowability of a composition of this invention.

As apparent from FIG. 3, when the novel isocyanuric acid derivative is used as the cross-linking agent, the fluidity of the molten material at the time of molding is improved and the curing speed becomes higher. Further as obvious from Table 1, the dimensional stability and heat-resistance of the molded article are improved according to this invention. Further, from the hardness data, it will be understood that the curing velocity is also improved by this invention.

When the material A was stored at the room temperature for 6 months and was then molded, substantially the same values as in FIG. 3 and Table 1 were obtained.

TABLE I

| | A | B |
|---|---|---|
| Insulation resistance (Ω) (after boiling) | 1×10¹⁴ | 4×10¹³ |
| Tan δ (IMH$_z$)×10⁴ | 145 | 160 |
| Heat deformation temperature (° C.) | 210 | 180 |
| Heat-resistance (°C./2 hrs.) | 200 | 180 |
| Molding shrinkage (percent) | 0.43 | 0.75 |
| After-shrinkage (E—24/160) (percent) | 0.03 | 0.05 |
| Barcol hardness [1] after— | | |
| 30 sec. | 4 | 0 |
| 60 sec. | 31 | 14 |

[1] Barcol hardness was determined while hot after 30 and 60 seconds after direct pressure molding of a disk (diameter 40 mm., thickness 3 mm.) at 155° C.

EXAMPLE 6

150 parts by weight of a diallyl phthalate prepolymer (Daiso Dap), 20 parts by weight of diallyl chlorenedate monomer, 60 parts by weight of isocyanuric acid derivative of the formula:

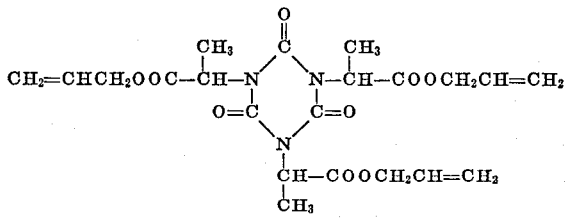

130 parts by weight of glass fibers (½ inch long), 760 parts by weight of calcium carbonate and 70 parts by weight of t-butyl perbenzoate were thoroughly mixed by means of a blender. The mixture was treated four times with hot rolls at 80 to 85° C. to make a sheet and the sheet was cut into pellets (3 to 4 mm.) with a pelletizer to obtain molding material C. The properties are shown in Table 2.

In exactly the same manner there was prepared a molding material D except that the isocyanuric acid derivative was completely replaced with a diallyl phthalate prepolymer. However, this molding material D was poor in fluidity or flowability and therefore no satisfactory shaped article was obtained.

TABLE 2

| | C |
|---|---|
| Electric insulation resistance (Ω) | 10¹⁵ |
| Electric insulation resistance (Ω) after boiling | 9×10¹³ |
| Tan δ (IMH$_z$)×10¹⁴ | 154 |
| Heat-resistance (° C./2 hrs.) | 200 |
| Molding shrinkage (percent) | 0.38 |
| After-shrinkage (E—24/160° C.) (percent) | 0.02 |
| Barcol hardness: | |
| After 30 sec. | 3 |
| After 60 sec. | 27 |

EXAMPLE 7

230 parts by weight of a diallyl phthalate prepolymer (Daiso Dap), 5 parts by weight of diallyl phthalate monomer, 70 parts by weight of isocyanuric acid derivative of Example 1, 170 parts by weight of glass fibers, 130 parts by weight of titanium oxide, 400 parts by weight of calcium carbonate, 15 parts by weight of calcium stearate and 8 parts by weight of t-butyl perbenzoate were treated in the same manner as in Example 1 to make a sheet and the sheet was crushed into flakes..

The flakes showed substantially the same characteristics as in Example 5.

EXAMPLE 8

2 mols of maleic anhydride, 0.8 mol of phthalic anhydride, 1.2 mols of isophthalic acid and 41 mols of propylene glycol were heated to react together to obtain an unsaturated polyester prepolymer having an acid value of 25.0 and a softening point of 62 to 65° C.

70 parts by weight of the unsaturated polyester prepolymer, 20 parts by weight of diallyl phthalate prepolymer, 10 parts by weight of isocyanuric acid derivative of Example 1, 3 parts by weight of t-butyl peroxybenzoate, 200 parts by weight of calcium carbonate and 2 parts by weight of zinc stearate were mixed and crushed in a ball mill. The mixture was melted by hot rolls, then cooled and coarsely crushed to a granular form of 10 to 30 meshes. Thus obtained molding material was left to stand at room temperature for a long period of time, but there did not occur blocking or agglomeration. When this material was molded at a temperature of 140° C. under a pressure of 40 kg./cm.² for 30 seconds, there was obtained a molded article excellent in the surface condition.

The characteristics of this molded article are shown in Table 3. Further the flow characteristics of this composition determined by a flow tester is shown in FIG. 4 as the curve I.

TABLE 3

| Item | Unit | Value |
|---|---|---|
| Bending strength | Kg./mm.$^2$ | 6 |
| Insulation resistance: | | |
| In the normal state | Ω | $10^{16}$ |
| After boiling for 2 hours | Ω | $10^{16}$ |
| Voltage resistance | Kv./mm. | 15 |
| Dielectric constant | (1MH$_z$) | 5 |
| Dielectric tangent | (1MH$_z$) | 10×10$^{-4}$ |
| Arc resistance | Sec. | 180 |
| Moisture absorption | Percent | 0.05 |

For comparison, the same procedure was repeated except that 70 parts by weight of the unsaturated polyester prepolymer, 30 parts by weight of a diallyl phthalate prepolymer, 3 parts by weight of t-butyl peroxybenzoate, 200 parts by weight of calcium carbonate and 2 parts by weight of zinc stearate were employed. The flowability of this material is shown in FIG. 4 as curve II. As apparent from FIG. 4, the flowing and curing characteristics are excellent when the isocyanuric acid derivative is employed.

EXAMPLE 9

0.8 mol of maleic anhydride, 1.2 mols of isophthalic acid, 0.6 mol of ethylene glycol and 1.5 mols of propylene glycol were reacted together in a conventional manner to obtained an unsaturated polyester prepolymer having an acid value of 22 and a softening point of 67 to 69° C. 25 parts by weight of the unsaturated polyester prepolymer, 9 parts by weight of the isocyanuric acid derivative of Example 6, 12 parts by weight of glass fibers (¼ inch long), 55 parts by weight of calcium carbonate, 5 parts by weight of titanium oxide, 0.70 part by weight of t-butyl perbenzoate and 2 parts by weight of zinc stearate were mixed together by a blender and the mixture was passed through rolls at 85 to 90° C. twice to obtain a sheet. The sheet was cooled and was crushed to be granular to obtain a molding material D.

The comparison of this molding material D with commercial diallylphthalate molding material E is as shown in FIG. 5 and in Table 4.

TABLE 4

| Samples | D | E |
|---|---|---|
| Insulation resistance (Ω) (after boiling) | 4×10$^{14}$ | 2×10$^{13}$ |
| Tan δ (1MH$_z$)×10$^4$ | 75 | 160 |
| Arc-resistance (sec.) | 180 | 186 |
| Thermal deformation temperature (° C.) | 230 | 180 |
| Heat-resistance (° C./2) | 200 | 180 |
| Bending strength (kg./mm.) | 105 | 83 |

EXAMPLE 10

20 parts by weight of the unsaturated polyester prepolymer of Example 9, 2.5 parts by weight of the isocyanuric acid derivative of Example 2, 15 parts by weight of glass fibers (½ inch long), 75 parts by weight of calcium carbonate and 0.70 part by weight of t-butyl perbenzoate were well mixed together by means of a ribbon blender and then the mixture was passed through rolls at 80 to 85° C. three times to obtain a sheet. This sheet was cut into pellets of a size of 3 to 4 mm. with a pelletizer to obtain a molding material. The properties of a cured molded article prepared from the above molding material are shown in Table 5.

TABLE 5

| | |
|---|---|
| Electric insulation-resistance (Ω) in the normal state | >10$^{15}$ |
| Electric insulation-resistance (Ω) after boiling | >10$^{14}$ |
| Tan δ(1MH$_z$)×10$^4$ | 79 |
| Arc-resistance (sec.) | 180 |
| Heat-resistance (° C./2) | >210 |
| Bending strength (kg./mm.) | 118 |
| Barcol hardness: | |
| After 30 seconds | 5 |
| After 60 seconds | 31 |

EXAMPLE 11

A decorative paper sheet printed with a wood grain pattern was impregnated with a solution of 85 parts of an unsaturated polyester prepolymer (prepared from 1.2 mols of maleic anhydride, 0.8 mol of isophthalic and 2.1 mols of ethylene glycol) having an acid value of 25.0 and a softening point of 65 to 69° C., 15 parts of the isocyanuric acid derivative of Example 1, and 1 part of t-butyl perbenzoate dissolved in 80 parts of acetone. The impregnated sheet was then dried to remove acetone to make a resinous sheet with a resin content of 55%. This sheet was placed on a plywood and the assembly was clamped by plated plates, and heated a molding press at 150° C. under 15 kg./cm.$^2$ for 5 minutes.

EXAMPLE 12

An α-cellulose paper of 2 mils was impregnated with a solution of 93 parts of a diallyl phthalate prepolymer (Daiso Dap, trademark of Daiso Chemical Co., Japan), 7 parts of the isocyanuric acid derivative of Example 2 and 1 part of benzoyl peroxide dissolved in 100 parts of acetone so that the resin content is 65%. The pregnated sheet was dried. Below this sheet there was placed a dried wood grain design paper sheet impregnated with the same resin composition so that the resin content is 30%. Below this latter sheet there was placed a kraft paper sheet impregnated with a phenol resin. The assembly was clamped between plated plates and heated at 155° C. under 30 kg./cm.$^2$ for 10 minutes.

The properties of the decorative sheets thus prepared are as follows:

TABLE 6

| | Example 11 | Example 12 |
|---|---|---|
| Scratch hardness (g. Clemens type) | 85 | 90. |
| Water resistance (mg./100 times, JIS K–6902) | 70 | 65. |
| Resistance to boiling water (after 2 hours) | No change | No change. |
| Resistance to staining (JIS K–6902): | | |
| 1% iodine alcohol | Good | Good. |
| 2% mercurochrome | do | Do. |
| Dyestuff | do | Do. |

EXAMPLE 13

100 parts by weight of a diallyl phthalate prepolymer (Daiso Dap), 20 parts by weight of the isocyanuric acid derivative of Example 2 and 1.5 parts by weight of t-butyl perbenzoate were dissolved in a mixture of 90 parts by weight of acetone and 25 parts by weight of toluene. A glass cloth (211 g./m.$^2$) was impregnated with the solution and was dried at 70° C. for 30 minutes and at 115° C. for 18 minutes to obtain a pregnated sheet having no stickiness at normal temperature. The resin content of this sheet was 45%.

Nine of such sheets were stacked and the assembly was clamped between mirror surface plates and heated at a temperature of 150° C. under a pressure of 50 kg./cm.$^2$ for 30 minutes to obtain a laminate F.

The same procedure was repeated except that the isocyanuric acid derivative was not employed to obtain a laminate G with a resin content of 46%.

The properties of these laminates F and G are as shown in Table 7.

TABLE 7

| | F | G |
|---|---|---|
| Insulation resistance (Ω) after boiling | 3.5×10$^{10}$ | 1.5×10$^{10}$. |
| ε(1MH$_z$) | 4.1 | 4.4. |
| Tan δ (1MH$_z$) | 0.008 | 0.010. |
| Heat-resistance (at 230 C. for 30 min.) | No change | Swelled. |
| Plating adhesion (kg.) | 8.8 | Plating impossible. |

The tests were conducted by JIS K–6911 and C–6481. In plating, Shipley's alkali bath was employed.

As will be apparent from the above, by using the novel isocyanuric acid derivative as a cross-linking agent, the heat resistance and platability are remarkably improved.

EXAMPLE 14

70 parts by weight of a diallyl phthalate prepolymer (Daiso Dap), 30 parts by weight of diallyl chlorenedate prepolymer, 7 parts by weight of the isocyanuric acid derivative of Example 6 and 1.0 part by weight of t-butyl perbenzoate were dissolved in a mixture of 70 parts by weight of acetone and 30 parts by weight of methyl ethyl ketone. A glass mat (380 g./m.²) was impregnated with the solution and was dried at 80° C. for 45 minutes and then at 110° C. for 16 minutes to obtain an impregnated sheet with a resin content of 51% and having no stickiness at normal temperature. Two of such sheets were overlapped with each other and clamped between mirror surface plates and heated at a temperature of 155° C. under a pressure of 40 kg./cm.² for 30 minutes to obtain a laminate having the following properties.

TABLE 8

| | |
|---|---|
| Insulation resistance after boiling ($\Omega$) | $6 \times 10^{-10}$ |
| $\epsilon(IMH_z)$ | 4.1 |
| Tan $\delta(IMH_z) \times 10^4$ | 90 |
| Heat-resistance (at 230° C. for 30 minutes) | O.K. |
| Flame-resistance (UL-94) | SE-1 |
| Plating adhesion (kg.) | 8.5 |

EXAMPLE 15

0.8 mol of maleic anhydride, 1.2 mols of isophthalic acid and 2.1 mols of propylene glycol were reacted together in a conventional manner to obtain an unsaturated polyester prepolymer having an acid value of 23 and a softening point of 66 to 68° C.

100 parts by weight of the above unsaturated polyester prepolymer, 30 parts by weight of the isocyanuric acid derivative of Example 2, 2 parts by weight of t-butyl perbenzoate and 15 parts by weight of titanium oxide were dissolved in a mixture of 70 parts by weight of acetone and 70 parts by weight of toluene.

A glass cloth (210 g./m.²) was impregnated with the suspension and was dried at 70° C. for 20 minutes and at 115° C. for 15 minutes to obtain an impregnated sheet having no stickiness at normal temperature. The resin content was 43%.

Nine of such sheets were stacked and clamped between mirror surfaces plates and heated at a temperature of 155° C. under a pressure of 30 kg./cm.² for 20 minutes to obtain a laminate H.

In a similar manner a laminate I was prepared by the use of a conventional commercial polyester type thermosetting resin composition wherein styrene is used as cross-linking agent.

The properties of these laminates H and I are as shown in the following table.

TABLE 9

| | H | I |
|---|---|---|
| Insulation resistance ($\Omega$) after boiling | $6 \times 10^{10}$ | $8 \times 10^{10}$ |
| Tan $\delta$ (IMH$_z$) | 0.0090 | 0.0120 |
| Heat-resistance (at 230 C. for 30 minutes) | No change | Swelled |
| Plating adhesion (kg.) | 10 | 0-1 |

EXAMPLE 16

100 parts by weight of the unsaturated polyester prepolymer of Example 15, 15 parts by weight of the isocyanuric acid derivative of Example 6 and 1.5 parts by weight of t-butyl perbenzoate were dissolved in a mixture of 70 parts by weight of toluene and 40 parts by weight of methyl ethyl ketone to prepare a solution. A glass mat (300 g./m.²) was impregnated with the solution and was dried at 75° C. for 30 minutes and then at 110° C. for 20 minutes to obtain an impregnated sheet with a resin content of 45% and having no stickiness at normal temperature.

Two of such sheets were clamped between mirror surface plates and heated at a temperature of 150° C. under a pressure of 35 kg./cm.² for 30 minutes to obtain a laminate J.

The same procedure was repeated except that a diallyl phthalate prepolymer was used instead of the isocyanuric acid derivative to obtain a laminate K.

The properties of these laminates J and K are as shown in the following table.

| | J | K |
|---|---|---|
| Insulation resistance ($\Omega$) after boiling | $6 \times 10^{10}$ | $2 \times 10^{10}$ |
| Tan $\delta$ (IMH$_z$) | 0.0085 | 0.0115 |
| Heat-resistance (230 C. for 30 min.) | No change | Swelled |
| Plating adhesion (kg.) | 10.5 | 0-0.5 |

What we claim is:

1. A thermosetting resin composition which is solid and not tacky at the normal temperature and which comprises (1) at least one solid polymerizable prepolymer selected from the group consisting of prepolymers of unsaturated polyesters and prepolymers of polydiallyl phthalates, (2) at least one solid cross-linking agent selected from isocyanuric acid derivatives represented by the general formula:

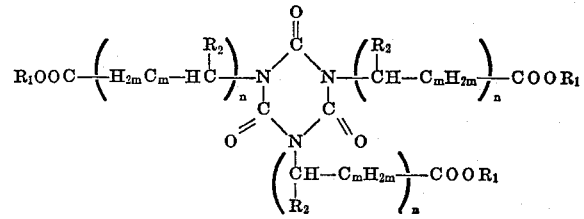

wherein $R_1$ represents allyl group, $R_2$ represents a member selected from the group consisting of hydrogen, methyl group and ethyl group, $m$ is an integer from 0 to 2 inclusive, $n$ is an integer from 0 to 1 inclusive, and the number of carbon atoms between each nitrogen atom and the corresponding —COOR$_1$ group is not higher than 3, and (3) a polymerization initiator.

2. A thermosetting resin composition as claimed in claim 1 wherein the polyester prepolymer has a softening point higher than 40° C. and an acid value of from 15 to 40.

3. A thermosetting resin composition as claimed in claim 1 wherein the polydiallylphthalate prepolymer has a softening point higher than 40° C. and a molecular weight of from 8,000 to 25,000.

4. A thermosetting resin composition as claimed in claim 1 wherein the cross-linking agent has a softening point higher than 40° C.

5. A thermosetting resin composition as claimed in claim 1 wherein the cross-linking agent is used in an amount of 1–70 parts by weight per 100 parts of the prepolymer.

References Cited

UNITED STATES PATENTS 3,050,496   8/1962   D'Alelio   260—886

FOREIGN PATENTS 1,249,523   9/1967   Germany.

MELVIN GOLDSTEIN, Primary Examiner

U.S. Cl. X.R.

117—132 B, 155 UA; 161—248, 251; 260—31.2 N, XA, 32.8 N, 33.6 UA, 40 R, 41 R, A, B, 41 C, AG, 875